United States Patent

Schulz et al.

[11] Patent Number: 6,055,089
[45] Date of Patent: Apr. 25, 2000

[54] PHOTOVOLTAIC POWERING AND CONTROL SYSTEM FOR ELECTROCHROMIC WINDOWS

[75] Inventors: Stephen C. Schulz, Tewksbury, Mass.; Lech A. Michalski, Pennington; Hermann N. Volltrauer, Englishtown, both of N.J.; John E. Van Dine, Faribault, Minn.

[73] Assignee: Minnesota Mining and Manufacturing Company, St. Paul, Minn.

[21] Appl. No.: 09/257,305

[22] Filed: Feb. 25, 1999

[51] Int. Cl.⁷ .................................................. G02F 1/153
[52] U.S. Cl. ........................ 359/270; 359/265; 359/275; 136/251
[58] Field of Search .................... 359/265, 270, 359/273, 275, 271; 136/251, 291

[56] References Cited

U.S. PATENT DOCUMENTS

| | | |
|---|---|---|
| 3,899,858 | 8/1975 | Zanker . |
| 4,006,966 | 2/1977 | Meyers et al. . |
| 4,281,208 | 7/1981 | Kuwano et al. . |
| 4,338,000 | 7/1982 | Kamimori et al. . |
| 4,475,031 | 10/1984 | Mockovciak, Jr. . |
| 4,529,873 | 7/1985 | Ballmer et al. . |
| 4,531,814 | 7/1985 | Ballmer . |
| 4,547,662 | 10/1985 | Cornwell . |
| 4,641,922 | 2/1987 | Jacob . |
| 4,724,311 | 2/1988 | Mechlenburg . |
| 4,768,865 | 9/1988 | Greenberg et al. . |
| 4,832,468 | 5/1989 | Ito et al. . |
| 4,872,745 | 10/1989 | Fujisawa et al. . |
| 4,906,675 | 3/1990 | Inagaki et al. . |
| 4,958,917 | 9/1990 | Hashimoto et al. . |
| 4,959,257 | 9/1990 | Mukherjee . |
| 5,042,923 | 8/1991 | Wolf et al. . |
| 5,069,535 | 12/1991 | Baucke et al. . |
| 5,097,358 | 3/1992 | Ito et al. . |
| 5,111,329 | 5/1992 | Gajewski et al. . |
| 5,136,419 | 8/1992 | Shabrang . |
| 5,142,407 | 8/1992 | Varaprasad et al. . |
| 5,151,816 | 9/1992 | Varaprasad et al. . |
| 5,228,925 | 7/1993 | Nath et al. .............................. 136/251 |
| 5,377,037 | 12/1994 | Branz et al. ............................ 359/265 |
| 5,384,653 | 1/1995 | Benson et al. .......................... 359/270 |
| 5,442,478 | 8/1995 | Lampert et al. ........................ 359/273 |
| 5,457,564 | 10/1995 | Leventis et al. ........................ 359/271 |
| 5,805,330 | 9/1998 | Byker et al. ............................ 359/265 |

*Primary Examiner*—Loha Ben
*Attorney, Agent, or Firm*—Lerner, David, Littenberg, Krumholz & Mentlik, LLP

[57] ABSTRACT

A sealed insulated glass unit is provided with an electrochromic device for modulating light passing through the unit. The electrochromic device is controlled from outside the unit by a remote control electrically unconnected to the device. Circuitry within the unit may be magnetically controlled from outside. The electrochromic device is powered by a photovoltaic cells. The photovoltaic cells may be positioned so that at least a part of the light incident on the cell passes through the electrochromic device, providing a form of feedback control. A variable resistance placed in parallel with the electrochromic element is used to control the response of the electrochromic element to changes in output of the photovoltaic cell.

35 Claims, 9 Drawing Sheets

PHOTOVOLTAIC POWERING AND CONTROL SYSTEM FOR ELECTROCHROMIC WINDOWS

FIELD OF THE INVENTION

The present invention relates to the powering and control of electrochromic windows, windshields, mirrors, glasses and other devices having variable light transmissivity. More specifically, the present invention relates to the powering and control of those devices using photovoltaic cells.

BACKGROUND OF THE INVENTION

Electrochromic devices have been increasingly utilized for actively controlling the transmissivity of glazing and other products. Compared to other methods of varying transmissivity, such as chemically darkening or photochromic glass, the electrochromic device has several advantages including the ability to adjust transmissivity according to user preference, a relatively rapid response time and a greater range of transmissivity. Electrochromic devices can be deposited on plastic film which increases the range of applications, including retrofitting. They do not require a constant source of power, other than current to make up for internal leakage, to maintain the device in any darkened state. For these reasons, electrochromic devices are seen as the most promising technology for future variable light transmission products such as windows, car windshields, car mirrors and eyeglasses.

An electrochromic device is often in the form of a series of layers deposited on a transparent substrate, although for mirrors the substrate does not have to be transparent. The functional electrochromic layers typically include a cathodic layer that takes on color as ions are intercalated into the layer, and an electron source layer located near the cathodic layer. The functional electrochromic layers are sandwiched between two transparent conductive layers, one of which is typically applied directly to the substrate.

In use, an electrical potential is applied between the two transparent conductive layers, causing a current to flow between the functional electrochromic layers. As the current flows, ions are depleted from the electron source layer and intercalated into the electrochromic material layer, causing it to darken. Most electrochromic devices have some amount of internal leakage, whereby electrons return to the electron source layer, reducing the darkness of the electrochromic material. In a steady state for a given transmissivity level, current flowing through the functional electrochromic layers because of the potential between the transparent conductive layers is equal to the internal current leakage in the functional layers. At steady state, the transmissivity of the device remains unchanged.

One means for providing an electrical current to an electrochromic device is the use of a photovoltaic cell. Because the photovoltaic cell provides electric current in response to light incident on the cell, the photovoltaic cell may be used both to power and to control the electrochromic window.

One configuration powering an electrochromic device with a photovoltaic cell is disclosed in U.S. Pat. No. 5,384,653, to Benson et al. In that configuration, an electrochromic layer is applied in one region of an inner surface of an insulated glass unit, and a photovoltaic cell array is applied in another area. As used herein, the term "insulated glass unit" refers to a multilayer unit having at least one sealed space between adjacent layers of glass. The photovoltaic cell is connected to the electrochromic layer through a polarity-reversing switch and a switch for switching between the photovoltaic cell and a battery. When a constant state of transmissivity is desired, the circuit is opened. The effects of internal current leakage, that slowly return the electrochromic layer to a transparent state, are ignored.

The polarity-reversing switch and the switch for switching between the photovoltaic cell and the battery in the '653 patent are housed in a control box remote from the window, and are connected to leads passing through the seal between two adjacent glass plates of the insulated glass unit. This is problematic because the useful lifetime of an insulated glass unit typically depends on the integrity of its seals. The typical insulated glass unit does not have penetrations in the seal for passing leads. The addition of electrical leads penetrating the seal therefore adds assembly cost and product reliability risk. Furthermore, the existence of an external, hard-wired control box presents serious installation problems to the architect and builder.

Photovoltaic cell arrays in electrochromic windows are typically positioned near the perimeter of an electrochromic window for aesthetic reasons. Such positioning is shown, for example, in the '653 patent. A shadow formed by framing around the glass will typically fall on the photovoltaic array, dramatically dropping its output. Because the shadowing changes with the time of day and season of the year, it may be impossible to position photovoltaic arrays to completely avoid such shadowing.

U.S. Pat. No. 5,377,037 to Branz et al. discloses an electrochromic/photovoltaic film for use on eyeglasses. The electrochromic layers and the photovoltaic layers are applied consecutively on a glass substrate. The layers are deposited in such a way that the incident light passes through the photovoltaic layers before reaching the electrochromic layers. A bleeder resistor is connected in series between the photovoltaic layer and the electrochromic layer. The resistor is connected in series between the photovoltaic device and the electrochromic device. The resister is selected for a desired response of the electrochromic device to variations in ambient light.

A disadvantage of a series resistor in such a system is that, as explained in more detail below, it is ineffective controlling an electrochromic device having negligible leakage. Even a small current from the photovoltaic cell will continue to darken an electrochromic device having negligible leakage. A series resistor must therefore have sufficient resistance to reduce current flow to nearly zero in order to maintain a steady state transmissivity in an electrochromic device having negligible leakage. Such large resistance values create unacceptable response times to change the electrochromic device from transparent to opaque.

Electrochromic technology has been used in the glazing of both windows and skylights. Manual control of the devices, even when powered and controlled by a photovoltaic cell, is often necessary to meet the particular needs of the occupants of a given room. Benson et al. discloses the use of a control box connected to the window by wire. As noted, this presents difficulties in reliability and installation. Additionally, in the case of skylights, added problems are presented by the necessity of routing the wires to a control box accessible to the room occupants.

Thus, despite substantial efforts devoted heretofore to the problems associated with the installation, powering and control of electrochromic devices, there are substantial, unmet needs for improvements in such components.

SUMMARY OF THE INVENTION

Accordingly, in one aspect of the invention, a device for modulating the transmission of light from a light source comprises an electrochromic element having variable light transmissivity in response to an electrical current through that layer, and a photovoltaic cell or array of photovoltaic cells connected to the electrochromic element for providing electrical current to the electrochromic element in response to the light from the light source that is incident on the photovoltaic cell or array. The photovoltaic cell or array is located on a side of the electrochromic element opposite the light source. At least a part of the light incident on the photovoltaic array is transmitted through the electrochromic element, resulting in a decrease in the amount of electrical current provided by the photovoltaic cell array, as the transmissivity of the electrochromic element is reduced, thus resulting in a self-regulating configuration.

In another aspect of the invention, a method for controlling the transmissivity of an electrochromic/photovoltaic system in response to a change in intensity of a light source includes the steps of providing an electrochromic element that changes in transmissivity in response to a change in electrical charge, and providing a photovoltaic current source for producing a current in response to light incident on the photovoltaic current source. The current source is connected to the electrochromic element. At least some of the incident light is passed through the electrochromic element before reaching the photovoltaic current source, so that a change in incident light resulting from the change in intensity of the light source is decreased as the electrochromic element changes in transmissivity.

In a further aspect of the invention, a device for modulating the transmission of light from a light source includes an electrochromic element for varying the transmission of light, the electrochromic element having first and second leads. The device also includes a photovoltaic cell for providing electrical current in response to light from the light source incident on the cell. The photovoltaic cell has a first lead connected to the first lead of the electrochromic element, and a second lead connected to the second lead of the electrochromic element. A shunt resistor is connected between the first and second leads of the electrochromic element, so that a portion of the current from the photovoltaic cell flows through the shunt resistor without flowing through the electrochromic element.

In yet another aspect of the invention, a device is provided for modulating the transmission of light, including an electrochromic element for varying the transmission of light, the electrochromic element having first and second leads. A photovoltaic cell having first and second leads provides electrical current in response to incident light, the first lead being connected to the first lead of the electrochromic element. A switch is provided for switching the second lead of the electrochromic element between the second lead of the photovoltaic cell and the first lead of the electrochromic element. In this manner, the system can be switched between a state in which the photovoltaic cell provides current to the electrochromic element, or a state in which the electrochromic element is shorted or reverse biased, for rapidly changing the electrochromic element to a state of transparency.

In yet another aspect of the invention, a device is provided for modulating the transmission of light. The device includes a transparent substrate, an electrochromic element mounted on the substrate for varying the transmission of light through the element in response to an electrical current, and at least one photovoltaic cell attached to the substrate for providing electrical current to the electrochromic element in response to the incident light. A means is provided for remotely varying the current provided by the photovoltaic cell to the electrochromic element.

DETAILED DESCRIPTION OF THE PREFERRED EMBODIMENT

Figure 1:
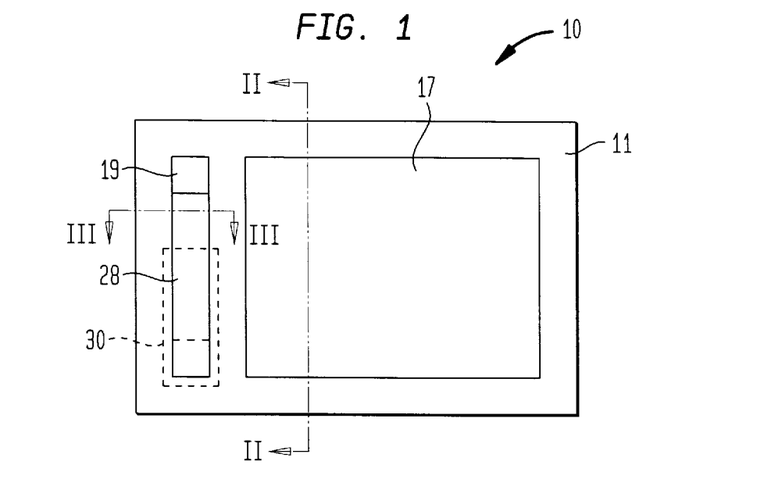
FIG. 1 is a schematic plan view of a window having an electrochromic element controlled and powered by a photovoltaic cell according to the invention.
Figure 2:
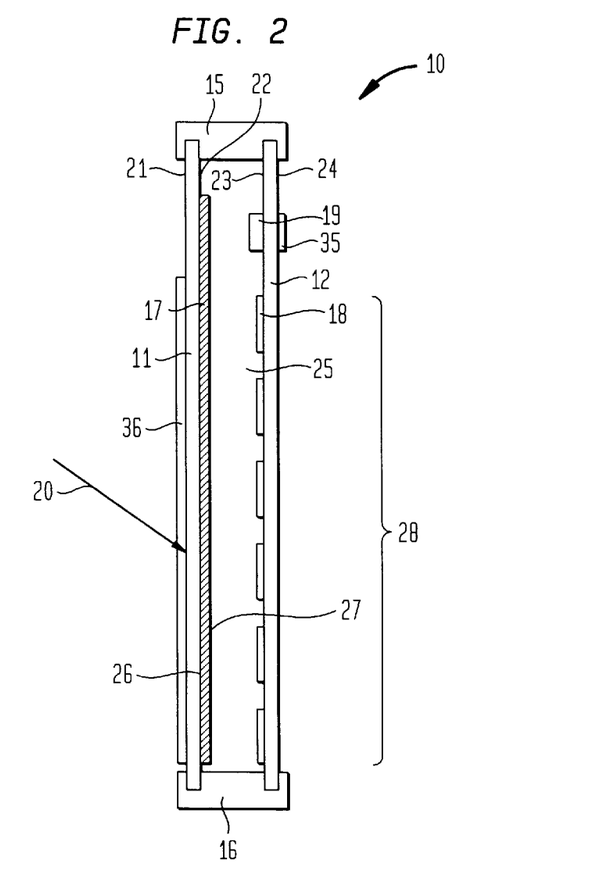
FIG. 2 is a schematic sectional view of the window of FIG. 1 taken through line II—II.

A window assembly 10 according to the invention, shown in FIGS. 1 and 2, includes an electrochromic element powered and controlled by a photovoltaic cell array.

Although the invention is illustrated with respect to the glazing art, it should be understood that the invention is not limited thereto, and that it is also applicable to eyeglasses, automotive mirrors and windows, and other applications where it is desirable to vary the transmissivity of a substrate.

The insulated glass unit 10 comprises two glass plates 11, 12 enclosing a sealed space 25 therebetween. End pieces or spacers 15, 16 seal the space between the plates 11, 12, maintain the plates in spaced relationship and provide outside mounting surfaces for installing the window in a building. Although not shown, the end pieces 15, 16 may contain a desiccant material in order to reduce moisture accumulation in the closed space 25. The end pieces 15, 16 are part of a frame (not shown) that runs the perimeter of the window.

The window is installed in a building so that incident light, represented by arrow 20, initially strikes a first surface 21 of the glass plate 11. Layers of an electrochromic element 17 are applied on a second surface 22 of the plate 11, facing the closed space 25. The electrochromic coating layers may be applied by sputtering, chemical vapor deposition or other thin film deposition technology. The electrochromic element typically comprises several adjacent layers that exchange ions, resulting in darkening or lightening, sandwiched between two transparent conductive layers 26, 27 for providing an electric potential across the thickness of the element.

It is preferred to apply the electrochromic coating on the inside surface 22 of the outside glass plate 11 because that configuration provides optimum solar load reduction performance. Incident energy 20 from the sun is absorbed by the electrochromic coating 17 before entering the closed space 25. Heat is returned to the outside of the building by conduction through the plate 11. Only a minimum of heat is transferred to the inside of the building by convection within the closed space 25 and conduction through plate 12.

An array 28 of low profile photovoltaic cells 18 are arranged on the inside surface 23 of the glass plate 12. Alternatively, the photovoltaic cells may be arranged on the inside surface 22 of the glass plate 11 in an area not occupied by the electrochromic device or behind the electrochromic device 17.

Figure 3:
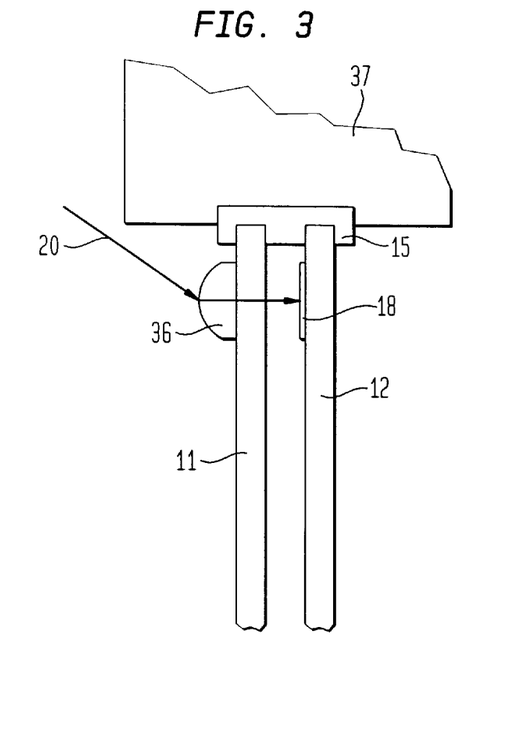
FIG. 3 is a schematic partial sectional view of the window of FIG. 1 taken through line III—III.

A cylindrical lens 36 (FIGS. 2, 3) may be affixed to the outer surface of the glass plate 21 in a position aligned with the array 28 of photovoltaic cells 18. The cylindrical lens 36 may be plastic, glass or another optical material. The lens collects incident light 20 and directs it to the photovoltaic cells 18.

The cylindrical lens 36 reduces the effect of shadows created by framing 37 (FIG. 3) around the glass. The lens is especially useful where the photovoltaic cells are arranged near the perimeter of the insulated glass unit. Such an arrangement otherwise results in increased shadowing of the photovoltaic cells by the framing 37. By collecting light from directions other than the line of sight between the light source and the photovoltaic cells, the cylindrical lens reduces the effect of shadowing on the control system.

A remote control system 45 (FIG. 4) for controlling the device of the invention includes a switching device 19 to control the connection between the photovoltaic cells 18 and the electrochromic coating 17. A control system is desirable to permit the user to control operation of the window according to operator preferences and ambient conditions. For example, on a sunny winter day, the building occupant might desire to short or disconnect the photovoltaic device so as to prevent tinting of the window. In another example, the building occupant may select a value of a shunt resistance that would allow modulation of the window's response to solar intensity, as also described below.

In a preferred embodiment, the switching device 19 comprises one or more magnetically controlled relays 43 mounted inside the insulated glass unit to make and break connections between the photovoltaic array, the electrochromic device and modulating circuitry mounted within the insulated glass unit. Specific configurations of the modulating circuitry are described below with reference to FIGS. 13–17.

Figure 4:
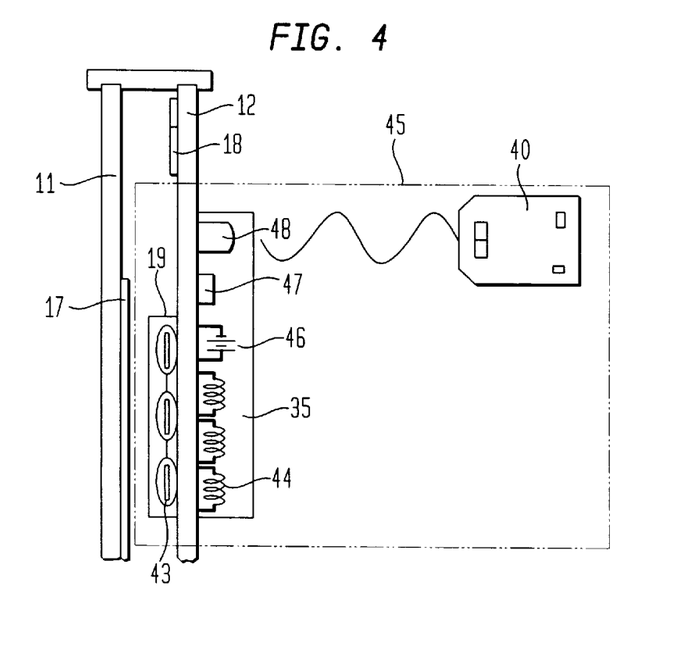
FIG. 4 is a schematic diagram of a window including a remote control system according to the invention.

The magnetically controlled relays 43 may consist of small metallic contacts that open or close under the influence of a magnetic field. One example of such a relay is commonly referred to as a Reed Relay and consists of a small contact encased in glass. Such components have proven very reliable over long-term use and are capable of withstanding significant levels of current.

The remote control system 45 for controlling the device of the invention further comprises control unit 35 containing one or more electromagnets 44 mounted on the exterior of the pane 12 in proximity with and opposite the switching device 19. The control unit 35 is not electrically connected to the switching device 19; i.e., no wires or other physical conductors connect the switching device and the control unit. Perforation of the sealed insulated glass unit to route conductors is therefore unnecessary.

The control unit 35 may be fixed by adhesive to the outside of the pane, and contains the electromagnets, relays (not shown) for actuating the electromagnets, integrated circuit chips 47 for controlling the device, infrared or other sensors 48 for communicating with a hand-held remote control device, and a power source such as a battery 46. Because the control unit 35 is mounted externally on the insulated glass unit, the battery may be replaceable. Actuation of the individual electromagnets in the control unit 35 open or close individual magnetically-controlled relays 43 within the switching device 19. The electromagnets contained in the control unit 35 may be biased with small permanent magnets (not shown) in order to permit the use of smaller electromagnets having lower power requirements.

Figure 5:
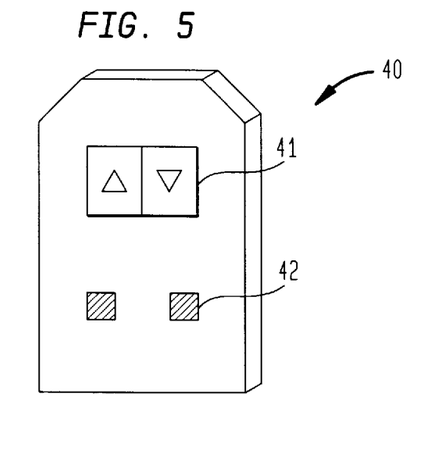
FIG. 5 is a schematic view of a hand-held remote control for controlling the device of FIG. 4 according to one embodiment of the invention.

The control unit 35 is, in turn, controlled by a user input unit 40, another component of a remote control system 45 of the invention. The user input unit 40 communicates with the control unit 35 through infrared pulses, radio waves, ultrasonic waves or another wireless communication medium. The user input unit 40 may have push buttons such as buttons 41 (FIG. 5) for varying the response of the electrochromic device to given levels of incident light, and buttons 42 for rapidly changing the electrochromic element to the fully transparent or fully darkened states. Additional button functions may be added or substituted on the user input unit 40 depending on the specific application.

In an alternate embodiment of the remote control system of the invention, the user input unit may comprise permanent magnets mounted in fixturing affixed to the exterior of the insulated glass unit. The fixturing is configured to selectively place the magnets in proximity with the magnetically controlled relays of switching device 19, permitting a user to control the modulating circuitry. In this arrangement, the function of the control unit 35 in actuating the switching device 19 is also performed by the fixturing.

Magnetically controlled relays offer significant advantages over other means for switching the circuitry within the insulated glass unit. However, in many applications, active devices such as integrated circuits can be used in an electronic switching system.

Adequately powering an active electronic switching system within an insulated glass unit adds complexity to the system. Integrated circuits can operate at the voltage levels compatible with electrochromic devices, but the system using active components would typically require some energy storage capability to be useful at low light levels. Batteries internal to the insulated glass unit could not provide the durability expected from such a unit, but large capacity capacitors would. While these would not be appropriate in all environments in which the magnetically controlled relays would be appropriate, in many applications the added capabilities afforded by active electronic circuits can be realized. The magnetically controlled relays of the preferred embodiment of the present invention permit placement of the control electronics, with the associated power supply, outside the insulated glass unit. The photovoltaic cells within the unit power only the electrochromic element through passive elements such as resistors.

In connection with the discussion of the control unit 35 shown in FIG. 4, it was noted that control unit 35 could contain, for example, infrared or other sensors 48 for communicating with a hand-held remote control device. However, it is also possible to include other sensors in the control unit 35 of the present invention in order to create feedback loops to control other sensed parameters such as light and heat. By the use of thermal, infrared or other visible sensors, the electrochromic windows can be actively controlled in this manner. The control of heat by sensing infrared radiation can thus be effected by using temperature as the control variable which determines the state of the electrochromic window. The control unit 35 can thus employ a thermal sensor as the input, particularly in a remote control situation. Thus, since infrared transmission can be effected more readily than is the case with visible light, the controls can be designed to take that into account. For example, a 5% change in visible transmission might well result in a 20% rate or change in heat input within a building. Under certain conditions it therefore might be worthwhile to give up 5% visible light within the building in order to reduce the heat load by the 20% or greater figure. Of course, sensors which sense visible light can also be employed. These, however, would be used to control visible light within the building and would thus be facing inwardly and not at the light source itself. Thus, the level of light within the building could be controlled, rather than the amount of light being transmitted through the electrochromic layer.

In the case where thermal sensors are included in the window, they could be used to provide an input for the outside temperature, thus used together with other sensors they could be employed to decide on the proper correlation level for the electrochromic layer in a complex total building control system.

It should also be noted in the above discussion that it has been generally assumed that the various embodiments of the present invention will operate consistently over the entire temperature range encountered by it during such use. However, there is a relationship between the operating temperature and the operation of these devices. In particular, at higher temperatures the output of photovoltaic devices tends to be reduced. On the other hand, at such higher temperatures the electrochromic devices tend to be rendered nontransmissive (colored) with greater ease. Therefore, in general, and at least within a limited range of operating temperatures, these two components will balance each other out. It is apparent, however, that in some applications it will be necessary to provide direct compensation to the system used under varying temperature conditions. One of ordinary skill in this art will therefore realize that this may be readily accomplished, such as by rendering some of the resistive elements utilized in the various embodiments hereof temperature sensitive, or by adding active circuitry to effect more sophisticated compensation therefor, particularly for use over wider temperature ranges.

In one embodiment of the invention (FIG. 1), the electrochromic element 17 occupies less than all the surface area of the glass plate 11, leaving an inactive area on one side. The photovoltaic cell array 28 and the switching device 19 are mounted in this inactive area, either on glass plate 11, or on a corresponding area of glass plate 12. This configuration may be used where light is expected to strike the window 10 in a relatively uniform pattern across its surface. The cylindrical lens 36 (FIGS. 2, 3) may be used in conjunction with the array 28 in this or the other described embodiments in order to increase incident light and to minimize the effects of shadowing.

Figure 6:
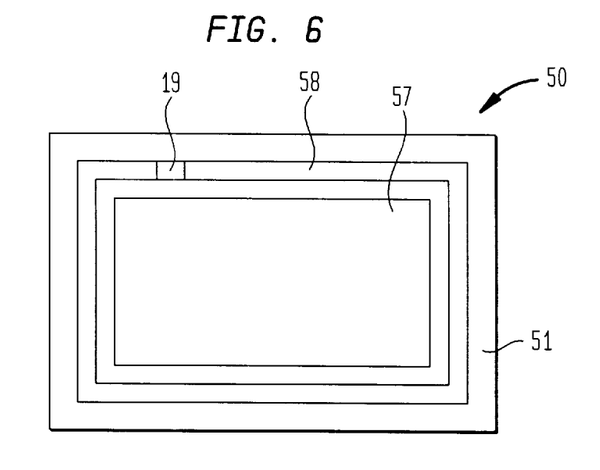
FIG. 6 is a schematic plan view similar to the view of FIG. 1, showing an alternative embodiment of the invention.

In the case where the outside light is expected to strike the window in an irregular pattern, for example, where reflections or shadows from other buildings affect the incident light, the photovoltaic cell array 58 (FIG. 6) may be arranged around the perimeter of the window, surrounding a centrally located electrochromic element 57. A switching device 19 may be installed on the perimeter of the window as well. In the embodiments of FIG. 1 and FIG. 6, the photovoltaic cells are located in regions of the window not covered by an active electrochromic element.

In another embodiment of the invention, a window 60 (FIG. 7) has an electrochromic element 67 with an active area overlapping or completely covering the zone in which the photovoltaic cell array 68 is located. In that embodiment, at least part of the light reaching the photovoltaic cells 68 must pass through the electrochromic element 67. By configuring the photovoltaic cells and the electrochromic element in this way, an "overvoltage" may initially be applied to the electrochromic element in order to accelerate switching of the windows to a nontransmissive state. The overvoltage compensates for voltage drops due to resistances of the transparent conductors and the electrochromic material itself, and causes the electrochromic element to change more quickly. By placing the photovoltaic cells in a position where incident light is reduced as the electrochromic element becomes less transmissive, the applied overvoltage is reduced as the window reaches a steady state. The level of overvoltage must be less than an excess voltage that can cause irreversible reactions within an electrochromic system that shorten the useful lifetime of the electrochromic element.

Figure 7:
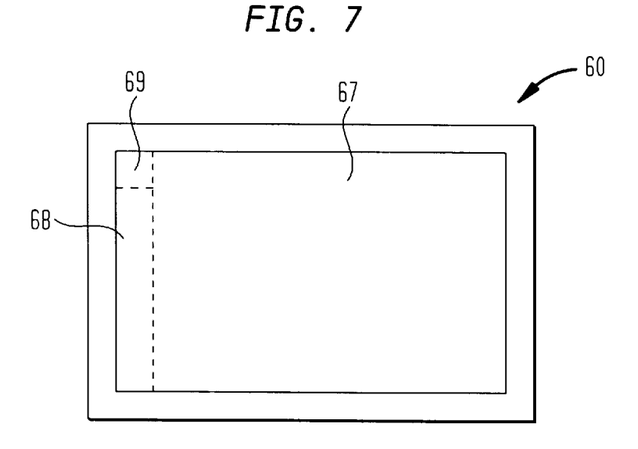
FIG. 7 is a schematic plan view similar to the view of FIG. 1 showing an alternative embodiment of the invention.

While the window 60 is shown in FIG. 7 having the photovoltaic cells 68 located completely within the active area of the electrochromic element 67, the photovoltaic cell 68 may alternatively be placed in a position where only a portion of the incident light is affected by the electrochromic element 67. Further, a small tinted or opaque shade 30 (FIG. 1) may be used to manually adjust the amount of light incident on the photovoltaic cells, and thereby adjust the response of the system.

Figure 8:
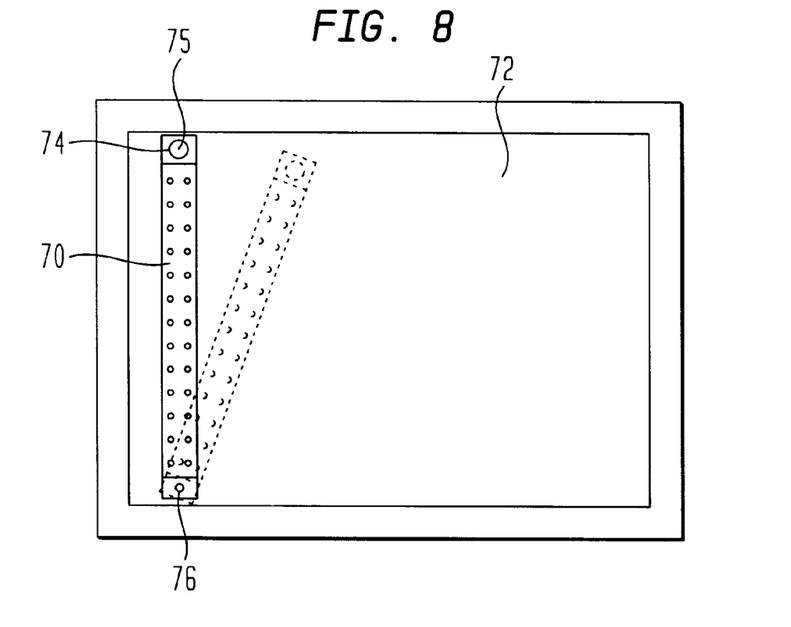
FIG. 8 is a schematic plan view similar to the view of FIG. 1 showing an alternative embodiment of the invention.
Figure 9:
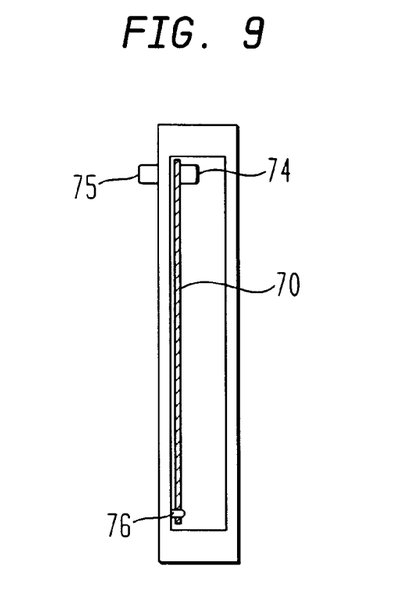
FIG. 9 is a schematic, side view of the embodiment of the invention shown in FIG. 8.

An alternative embodiment of the invention is thus shown in FIG. 8. In this embodiment a movable photovoltaic cell or panel of photovoltaic cells 70 is employed. Thus, in this embodiment the active area of the electrochromic element 72, with the photovoltaic cells 70 in the initial position shown in FIG. 8, occupies less than all of the surface area of the glass plate 11 leaving the photovoltaic cells 70 in the inactive area of glass plate 11 on one side thereof. In this configuration the embodiment corresponds to that shown in FIG. 1. However, as indicated, the photovoltaic cells 70 in this case are movable within the insulated glass unit shown in FIG. 8. Attached to the photovoltaic cell is a permanent magnet 74 and a freely movable external magnet 75, which is magnetically coupled to the internal magnet 74 through the glass plate 11. Furthermore, either one of these magnets, 74 or 75, could be replaced with a magnetic material, such as soft steel. Thus, movement of the external permanent magnet 75 will cause the internal magnet 74 to move with it, causing the photovoltaic cells 70 to pivot about pivot point 76 into a configuration such as that shown by the phantom view in FIG. 8. The degree of such movement can thus determine the degree of shading of the photovoltaic cells by the active electrochromic device, or, that is, the portion of the photovoltaic cells which are behind the active electrochromic element 67. This configuration permits the arrangement to have self-regulating properties. Over a rather wide range of incident light levels, the system can therefore remain close to an equilibrium state. That is, the amount of light which reaches the photovoltaic cells by passing through the electrochromic layer permits the photovoltaic cells to generate just the necessary amount of current and voltage to maintain the electrochromic layer near the desired transmissivity level.

The three cases represented by FIGS. 1, 7 and 8 may thus be considered on a comparative basis. Thus, in the embodiment represented by FIG. 1 in which the photovoltaic cells are separated from the area of the electrochromic layer, it is generally possible to include sufficient photovoltaic cells so as to provide enough power to convert the electrochromic layer to its maximum nontransmissive state (highest extent of coloring) by having photovoltaic cells which comprise less than 5% of the area of the electrochromic layer. Thus, at a light intensity of about one sun, the equilibrium color or transmissivity of the electrochromic layer will be at its maximum colored state, and the amount of light transmitted therethrough will be about 2 to 3% of the light impinging on the electrochromic layer. As the intensity of light impinging upon the electrochromic layer varies from essentially zero up to about one sun in intensity, the amount of light transmitted through the electrochromic layer will initially increase rapidly until sufficient voltage is generated by the photovoltaic cells in order to begin rendering the electrochromic layer nontransmissive, and then increase more slowly as the electrochromic layer becomes fully nontransmissive. Any additional light impinging on the electrochromic layer will not color that layer any further, and therefore the intensity of the transmitted light will increase but will remain at from 2 to 5% of the incident light. In such an arrangement, in order to reach a minimum of light transmitted through the electrochromic layer at lower levels of incident light, one can employ a larger area of photovoltaic cells.

In the embodiment represented by FIG. 7, in which the photovoltaic cells are located fully behind the electrochromic layer, the light transmitted through the electrochromic layer will always increase with increasing light intensity, but the rate of increase and the ultimate amount of light so transmitted will depend on the size of the photovoltaic cells. Thus, in this case, as the intensity of light increases, a point will be reached where the output from the photovoltaic cells begins to color the electrochromic layer. As the light intensity further increases, the output from the photovoltaic cells will concomitantly increase, and therefore the level of nontransmissivity of the electrochromic layer will also increase, tending to reduce the output of the photovoltaic cell, and ultimately reaching an equilibrium level. In this embodiment, the use of a larger area of photovoltaic cells will have the effect of reaching a lower level of optical transmission based on a given intensity of incident light, and to thereby increase the degree of regulation.

Turning to the embodiment represented by FIG. 8, this embodiment can correspond to a continuous range of shielding of the photovoltaic cells by the electrochromic layer from the embodiment represented by FIG. 1, in which the photovoltaic cells are completely separate from the electrochromic layer and not shielded thereby, to an embodiment in which the photovoltaic cells are totally or almost completely behind or shielded by the electrochromic layer. The effect of same is thus intermediate between the effects described with respect to FIGS. 1 and 7. Compared to the situation with FIG. 1, with the same size or area of photovoltaic cells, a partially covered photovoltaic cell will result in faster coloring from the transmissive state, since in that state the entire area of the photovoltaic cells generates the power to drive the electrochromic layer. In a colored or nontransmissive state, however, the steady state will be controlled mostly by the exposed portion of the photovoltaic cells. The net effect of this is that the entire area of the photovoltaic array will initially drive the electrochromic layer, while when in a nontransmissive state only a fraction will drive the electrochromic layer, resulting in extremely fast switching to the desired level. Thus, the fraction of the photovoltaic cell area covered by the electrochromic layer will principally determine the final equilibrium level of nontransmissiveness. This therefore provides for a wide range of equilibrium coloration levels to be obtained with a minor change in the position of the photovoltaic array. The benefits of this device can also be enhanced utilizing a multicell photovoltaic array; i.e., one with two or more cells in series. Thus, by placing one cell or part of one cell behind the electrochromic layer, the current of all of the cells is controlled. That is, since these cells are in series, the same current passes through all of them. Therefore, by influencing the current of the shaded or partially shaded cell by means of the electrochromic transmissivity the overall current is controlled. This configuration therefore tends to enhance the feedback effect obtained thereby.

Figure 10:
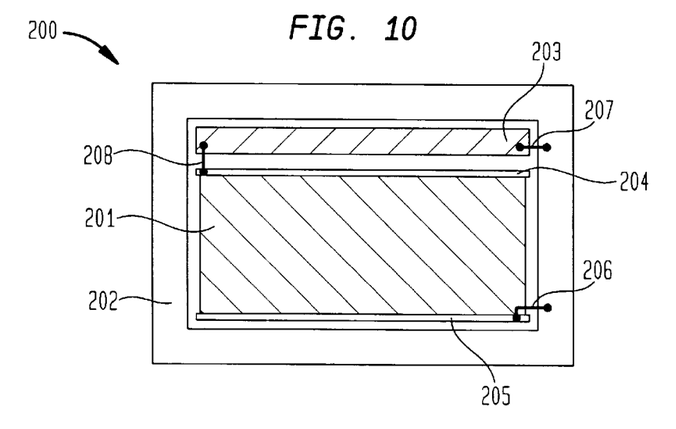
FIG. 10 is a schematic plan view similar to the view of FIG. 1 showing an alternative embodiment of the invention.

An electrochromic device as used in the present invention typically comprises bus bars 204, 205, as shown in FIG. 10. The bus bars provide a substantially constant potential across one side of the electrochromic device 201. It is sometimes necessary to connect a terminal of the photovoltaic cells 203 with a distant bus bar, such as bus bar 205. In one aspect of the present invention, the spacer 202 of an insulated glass unit 200 is constructed from a conductive material such as stainless steel, and is used as a conductor for conducting current to the distant bus bar 205. Typical insulated glass unit construction utilizes stainless steel or another conductive material for the spacer 202, making it unnecessary to specially construct the insulated glass unit for this purpose.

Figure 11:
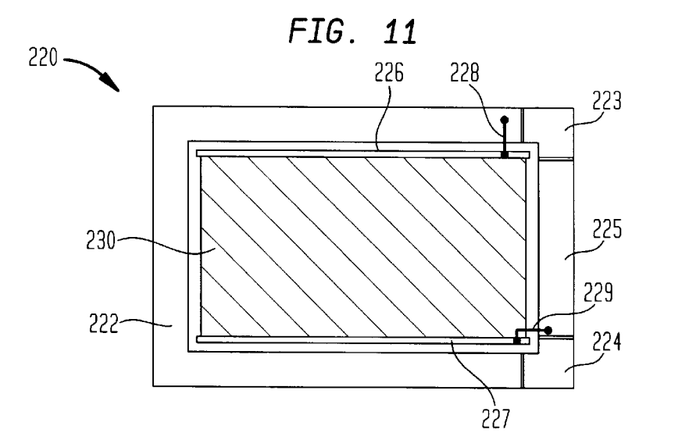
FIG. 11 is a schematic plan view similar to the view of FIG. 1 showing an alternative embodiment of the invention.

As shown in FIG. 11, the photovoltaic cell array 203 has leads 207, 208 at opposite ends. The lead 208 is connected directly to the bus bar 204 which is proximate photovoltaic cell array 203. The lead 207, however, connects with the conductive spacer 202, which, in turn, is connected by lead 206 to the opposite bus bar 205. It is therefore unnecessary to print or otherwise provide a long lead from the photovoltaic cell array 203 to the distant bus bar 205.

In another aspect of the invention utilizing the conductive properties of the spacer, the spacer 222 (FIG. 11) is separated by insulating corner units 223, 224, forming an isolated conductive portion 225 of the spacer 222. The bus bar 226 on one side of the electrochromic device 230 is connected by lead 228 to the large portion of the spacer 222. The opposite bus bar 227 is connected by lead 229 to the isolated conductive portion 225 of the spacer.

The configuration shown in FIG. 11 permits powering the electrochromic device 30 from outside the insulated glass unit 220 without the use of wires extending through the seals, which may compromise the integrity of the insulated glass unit. Thus, all powering and modulating circuitry may be mounted on the outside of the glass unit and may furthermore be mounted remote from the glass unit.

Figure 12:
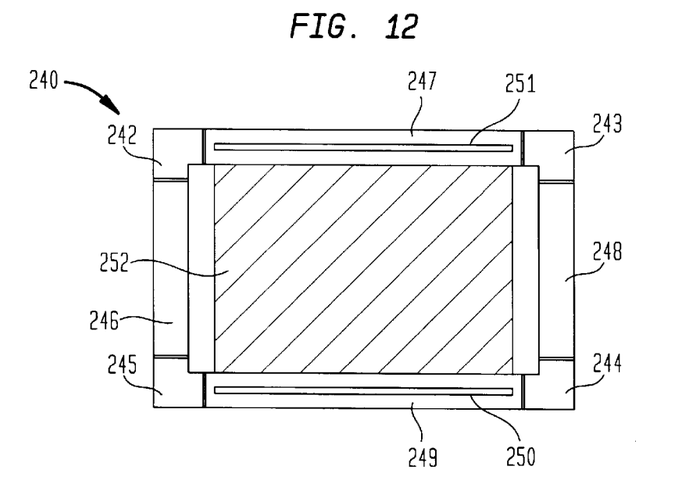
FIG. 12 is a schematic plan view similar to the view of FIG. 1 showing an alternative embodiment of the invention.
Figure 13:
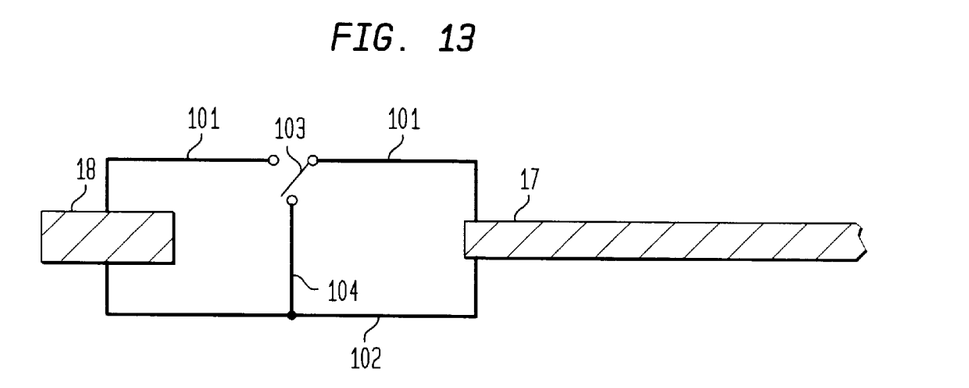
FIG. 13 is a schematic circuit diagram depicting an electrochromic element powered and controlled by a photovoltaic cell according to an embodiment of the invention having a two-position switch.

In another embodiment, an insulated glass unit 240 (FIG. 12) has insulating corner portions 242–245 at each corner, forming four isolated conductive portions 246–249 of the spacer. In that embodiment, instead of printing a bus bar directly on the glass, a conductive sealant 251 is placed between the electrochromic device 252 and the isolated conductive portion 247, providing an electrical connection between a complete edge of the electrochromic device and the isolated portion of the conductive spacer. Likewise, a conductive sealant 250 is placed between the isolated portion 249 of the spacer and the electrochromic device 252. As in the configuration of FIG. 11, the configuration of FIG. 12 provides for supplying power and modulation to the electrochromic device from outside the insulated glass unit, without compromising the integrity of the seal.

In a preferred embodiment, the modulating/connecting circuitry such as switching device 19 (FIG. 1) associated with the electrochromic/photovoltaic system is surface mounted together with the photovoltaic cell array 28 on one of the inside surfaces 22, 23 of the window assembly 10, and is encapsulated therein. The connecting circuitry will now be described with reference to FIGS. 13–17.

First and second leads 101, 102 (FIGS. 13, 15, 16, 17) connect the photovoltaic cell 18 to the electrochromic element 17. In a simple control circuit according to the invention (FIG. 13), the lead 101 is interrupted by a switch 103. The electrochromic element 17 may thereby be alternatively connected to the photovoltaic cell 18 or may be shorted with shunt 104. In addition, the switch 103 may have an intermediate position, wherein the electrochromic element 17 is in an open circuit. In the connected state, the photovoltaic cell powers and controls the electrochromic window causing it to darken and lighten in proportion to the incident light on the photovoltaic cell. In the shorted state, the electrochromic window clears rapidly and remains clear independent of incident light on the photovoltaic cell, providing a maximum solar heat gain in the building. The shorting circuit through shunt 104 may be used in the winter months where solar heating is desired and may also be used for fairly responsive clearing of the window whenever desired. In the case of an open circuit, where switch 103 is left in an intermediate position, the electrochromic window 17 clears slowly as a result of internal leakage alone. Where electrochromic devices having very low internal leakage are used, the switch may be left in the open state to maintain a fairly constant level of transmissivity.

The switching unit 19 (FIG. 2) may contain a magnetically controlled relay performing the function of the switch 103. In this simple arrangement, the window may be remotely controlled to a clear state (shorted), a relatively constant level of transmissivity (open switch) or a state wherein transmissivity is a function of incident light (powered by photovoltaic cells).

In another embodiment of the invention, a variable resistor 110 (FIG. 15) is placed in the circuit in parallel with the electrochromic element 17, and is connected to leads 101, 102. The variable resistor 110 shunts current from the photovoltaic cell 18 away from the electrochromic element 17 in an amount inversely related to the variable resistance. The variable resistor may comprise a variable resistor or a network of discrete resistors providing incremental resistance values by switching interconnecting circuitry.

Figure 14:
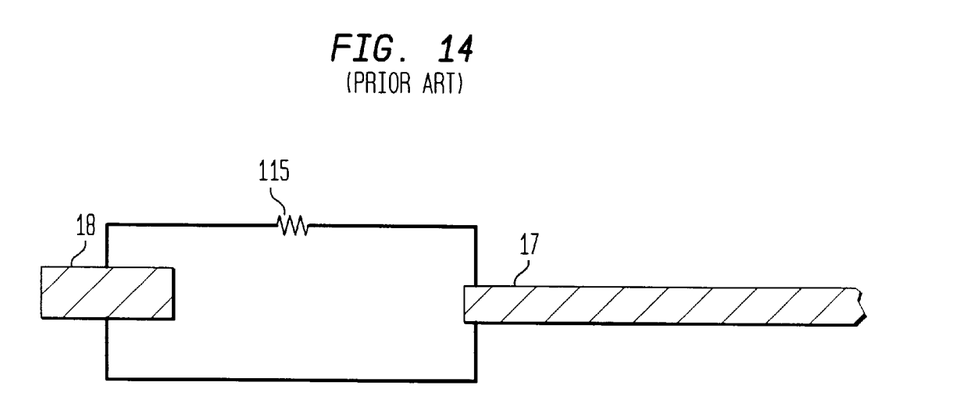
FIG. 14 is a schematic circuit diagram of a prior art electrochromic element powered by a photovoltaic cell.
Figure 15:
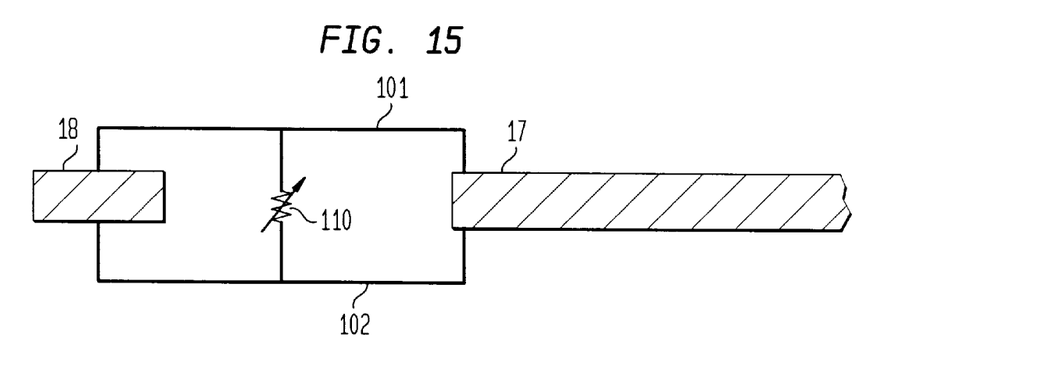
FIGS. 15–17 are schematic circuit diagrams depicting electrochromic elements powered and controlled by photovoltaic cells and having a parallel resistor according to alternative embodiments of the invention.

The parallel resistance 110 shown in FIG. 15 has distinct advantages over the prior art series resistor 115 shown in FIG. 14, especially where the electrochromic element 17 has low or negligible leakage. Referring to FIG. 14, in a steady state, photovoltaic cell 18 acts as a current source at the voltage of the array up to the maximum current determined by the intensity of solar irradiation on the array. If the current from the photovoltaic cell exceeds the internal current leakage in electrochromic element 17, the electrochromic element continues to accumulate charge with a resulting decrease in transmissivity until the device is fully colored or until an equilibrium voltage is reached. In theory, the series resistor 115 reduces the current flowing through the electrochromic device 17 for a given output voltage of the photovoltaic cell 18. In order to maintain a steady-state transmissivity of an electrochromic element 17 having extremely low internal leakage values, however, the current through the electrochromic element must be reduced to nearly zero, requiring an extremely high series resistance 115. That high series resistance 115 is problematic because it creates unacceptably high response times for tinting or clearing the electrochromic device 17.

It has been found by the inventors that a parallel (shunt) resistance 110 (FIG. 15) provides a practical solution to the control of low internal leakage electrochromic elements. The shunt resistor 110 effectively creates an additional current leakage path for the electrochromic device 17. In a steady state system, a maintenance current produced by the photovoltaic cell 18 is equal to the leakage current of the electrochromic element 17, maintaining a constant charge within the electrochromic element 17. The leakage of the electrochromic element 17 can be "adjusted" by changing the value of the variable shunt resistor 110. The result is the change in response of the electrochromic element to a given output of the photovoltaic array. In this way, electrochromic elements having extremely low internal current leakage may be precisely controlled without adversely effecting the response time of the system.

Figure 18:
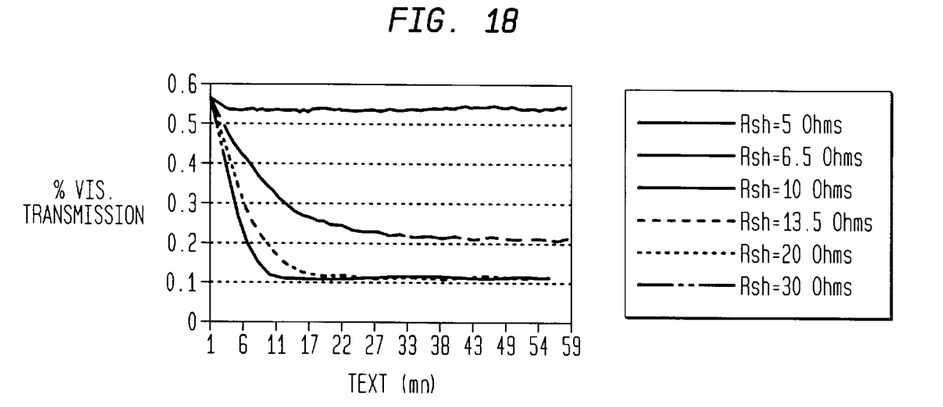
FIG. 18 is a graphical representation of the time response of an electrochromic element with significant internal leakage and having a parallel resistor, to a step function of increasing incident light, at various shunt resistances.

The data presented in FIGS. 18–22 demonstrate the improved control of a photovoltaic/electrochromic system using a variable shunt resistor. The graph of FIG. 18 shows the time response of a system containing an electrochromic element having significant internal leakage, at various shunt resistor values. The data presented in FIG. 18 was obtained from the system in which the electrochromic element was powered by a computer-programmed power supply emulating a photovoltaic array subjected to the sun. The transmissivity of the actual electrochromic element is plotted on the vertical axis. It can readily be seen that the steady state transmissivity for a given level of incident light may be varied by varying the shunt resistance.

Figure 19:
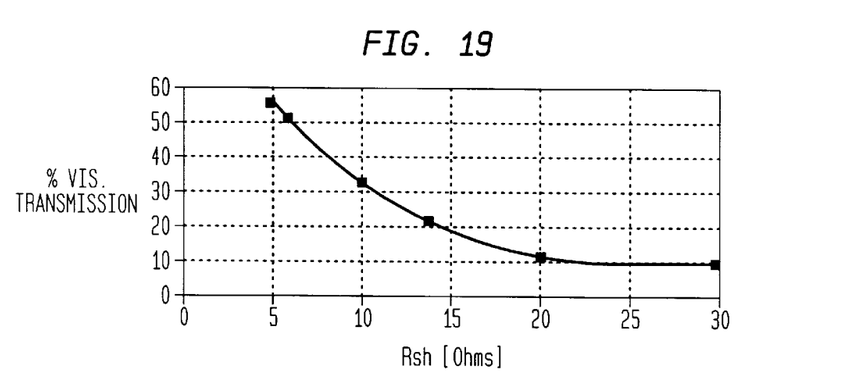
FIG. 19 is a graphical representation of the steady state transmissivity in full sun of an electrochromic element with substantial internal leakage and having a parallel resistor, for various resistor values.

FIG. 19 shows the same system as FIG. 18 plotting steady state transmissivity against the shunt resistance. FIGS. 18 and 19 clearly demonstrate the ability to control the response of electrochromic devices having relatively high internal leakage using a parallel or shunt resistance.

Figure 20:
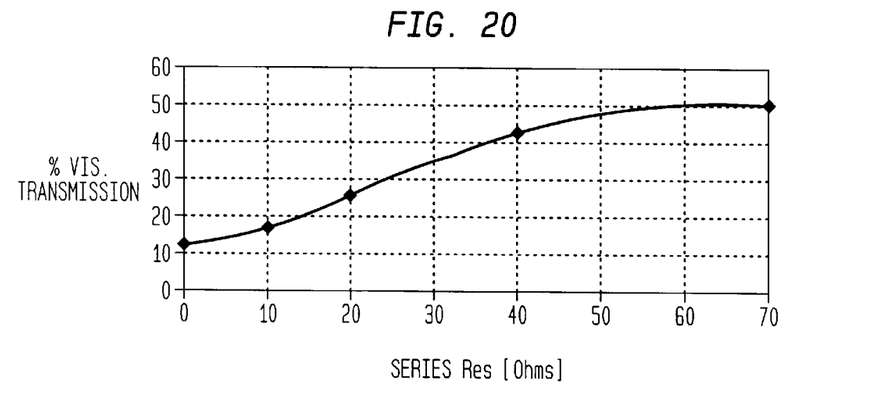
FIG. 20 is a graphical representation of the steady state transmissivity in full sun of a prior art electrochromic element with significant internal leakage and having a series resistor, at various resistances.

FIG. 20 shows a graph similar to FIG. 19, but wherein the resistance values represent a series resistance as illustrated in FIG. 14. The electrochromic device used to generate the data shown in FIG. 20 had a significant amount of internal leakage. FIG. 20 demonstrates that an electrochromic device having significant leakage may be effectively controlled using series resistance as is known in the art.

Figure 21:
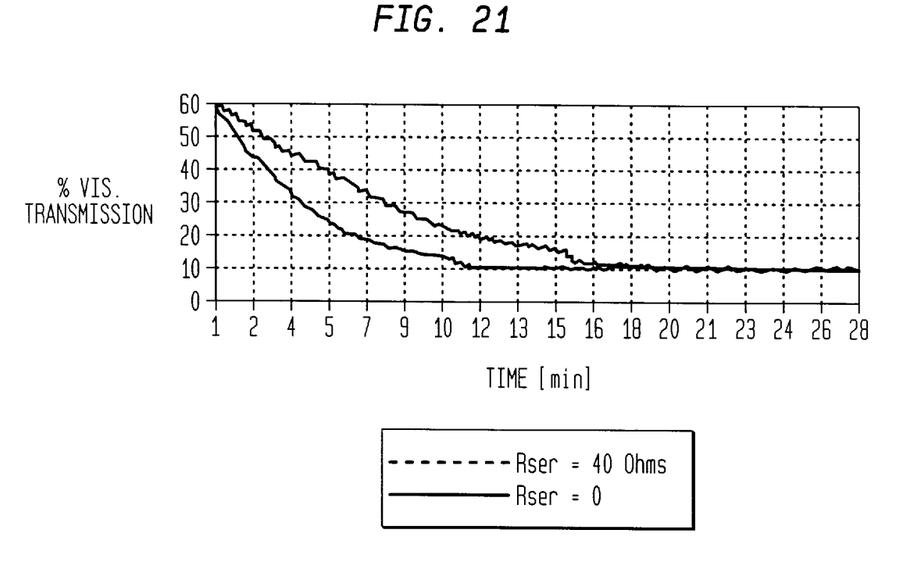
FIG. 21 is a graphical representation of the time response of a prior art electrochromic element with negligible internal leakage and having a series resistor, to a step function of increasing incident light at two resistances.
Figure 22:
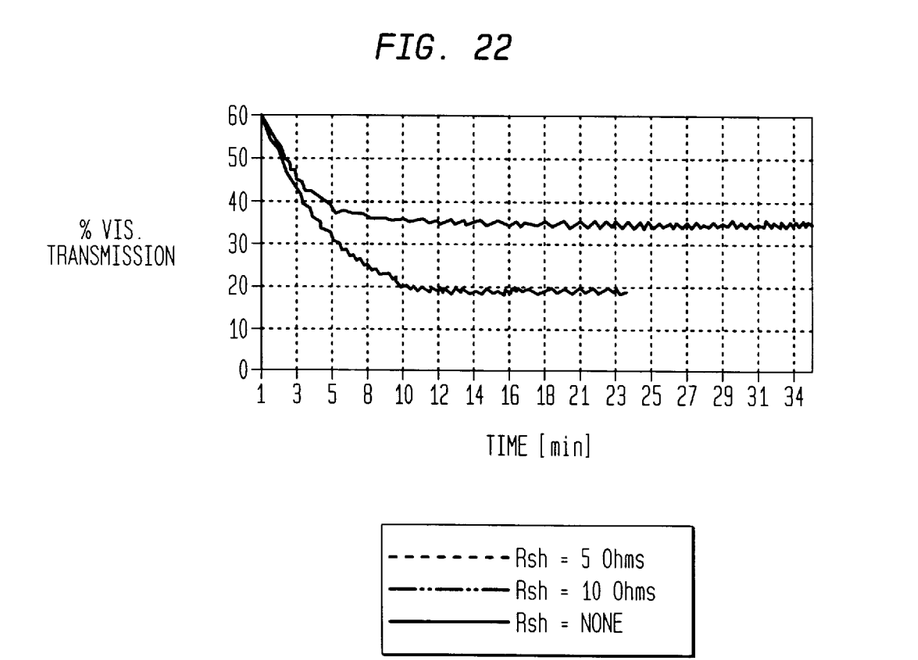
FIG. 22 is a graphical representation of the time response of an electrochromic element with negligible internal leakage and having a parallel resistor, to a step function of increasing incident light at several resistances.

FIGS. 21 and 22 show a comparison of series versus parallel resistor control for systems containing an electrochromic element with negligible current leakage. FIG. 21 compares the time response for such a system containing a large series resistor with a similar system containing no series resistance. It can be seen that while the rate of change of transmissivity is altered by changing the series resistance, the steady state transmissivity is not changed. It may be concluded that a system having an electrochromic device with negligible leakage may not be effectively controlled using the illustrated series resistance.

In contrast, as shown in FIG. 22, a shunt resistance may be used to control a system with an electrochromic element with negligible current leakage. The figure shows that the steady state transmissivity of the electrochromic device is a strong function of the shunt resistance, and transmissivity may therefore be controlled effectively using shunt resistance.

In another embodiment of the invention, relays 120, 121, 122 (FIG. 16) are used in conjunction with the shunt resistor 123 to control the device. In that embodiment, the electrochromic element 17 may be connected directly to the photovoltaic cell 18 without any shunt resistance (relay 120 closed, relays 121, 122 open), may be shorted (relay 120 closed), or may be connected to the photovoltaic cell 18 in parallel with a resistor 123 (relays 120, 121 closed; relay 122 open). In this manner, the electrochromic element 17 may be rapidly charged, rapidly discharged or maintained as a function of photovoltaic cell output, respectively.

Figure 16:
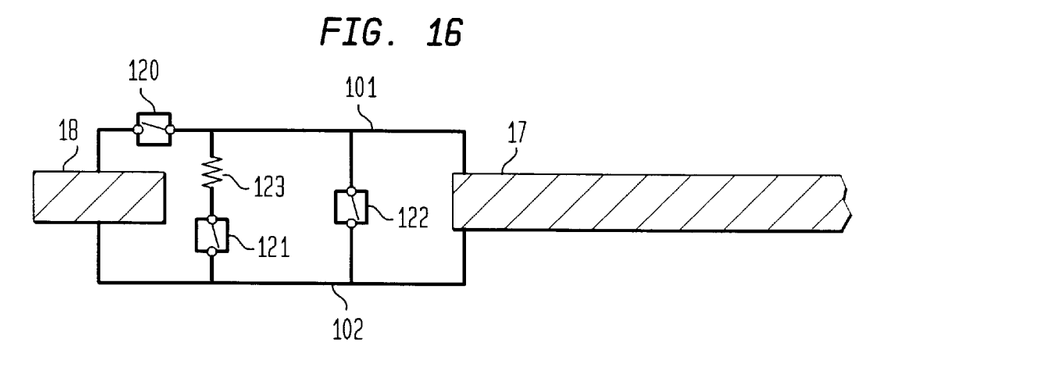
Figure 17:
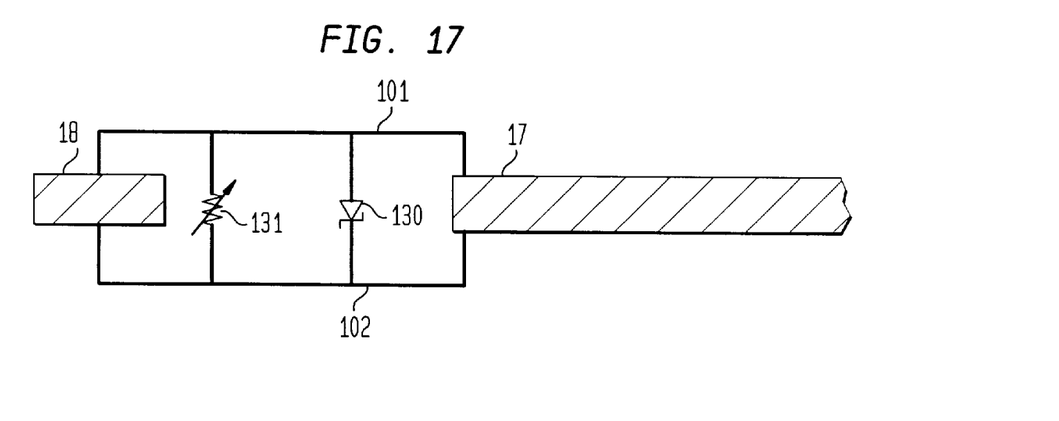

The embodiment shown in FIG. 16 may be altered by adding additional shunt resistors with associated relays, effectively performing the function of a variable resistor. A system using relays, such as illustrated in FIG. 16, is especially suited for low profile, surface mounted componentry used in the present invention. Such a system is further ideally suited for control by a switching device such as device 19 containing discrete, magnetically controlled relays. As discussed above, each of the relays may be controlled remotely from outside the sealed glass unit by electromagnets or permanent magnets.

A zener diode 130 (FIG. 17) may be used to limit the voltage to which the electrochromic element 17 is subjected. Such protection may be important because, as noted, excessive voltage may cause irreversible reactions within the electrochromic element which would shorten its useful life. The zener diode 130 may be placed in parallel with a variable resistance 131 between the leads 101, 102. Under normal operation, the zener diode draws essentially no current. During voltage surges or spikes, the voltage-regulating portion of the resistance curve is utilized, diverting excess current from the electrochromic element.

The use of a zener diode permits selecting commercial photovoltaic arrays that may not be perfectly matched to the damage threshold of the electrochromic device. Zener diodes are available in fine voltage increments selectable to match the electrochromic element damage threshold.

Elements of the various embodiments of the inventions may be combined or altered without departing from the present invention. For example, a zener diode or a variable resistor may be placed in parallel with the electrochromic element 17 in the embodiment of FIG. 15. As a further example, the remote control 45 may be used in conjunction with any embodiment containing relays or variable resistors for remote control of those elements. As these and other variations, combinations and modifications of the features discussed can be employed without departing from the present invention, the foregoing description of the preferred embodiments should be taken by way of illustration and not by way of limitation of the present invention as defined by the claims.

We claim:

1. A device for modulating the transmission of light from a light source, comprising:

an electrochromic element having light transmissivity that is variable in response to an electrical current; and at least one photovoltaic cell electrically connected to said electrochromic element for providing said electrical current to said electrochromic element in response to light from the light source incident on said cell;

said photovoltaic cell located on a side of said electrochromic element opposite said light source, whereby light transmitted through said electrochromic element comprises at least a part of said light incident on said photovoltaic cell, and whereby said electrical current provided by said photovoltaic cell is decreased as said transmissivity of said electrochromic element is reduced.

2. The device as claimed in claim 1, wherein said electrochromic element has an overcurrent value at which rapid change in transmissivity occurs; said photovoltaic cell providing said electrical current at said overcurrent value in response to an increase in light from the light source.

3. The device as claimed in claim 1, wherein said electrochromic element further has a maintenance current value at which no change in transmissivity occurs; said photovoltaic cell providing said current at said maintenance current value at a constant level of light from the light source.

4. The device as claimed in claim 1, further comprising a lens for collecting the light from the light source and directing the light to said photovoltaic cell.

5. The device as claimed in claim 1, further comprising a zener diode electrically connected in parallel with said electrochromic element for protecting said electrochromic element from too high a voltage.

6. The device as claimed in claim 1 wherein said photovoltaic cell is movably mounted, whereby the amount of light incident on said photovoltaic cell is variable.

7. The device as claimed in claim 6 wherein said photovoltaic cell includes a first end and a second end, said first end of said photovoltaic cell including a pivot point.

8. The device as claimed in claim 7 wherein said second end of said photovoltaic cell includes a first magnetic element, and said device includes a second magnetic element, said second magnetic element being movably mounted with respect to said first magnetic element whereby movement of said second magnetic element can cause pivotable movement of said photovoltaic cell with respect to said electrochromic element.

9. A device for modulating the transmission of light from a light source, comprising:

an electrochromic element having light transmissivity that is variable in response to an electrical current; and at least one photovoltaic cell electrically connected to said electrochromic element for providing said electrical current to said electrochromic element in response to light from said light source incident on said cell;

said photovoltaic cell being manually mounted with respect to a side of said electrochromic element opposite said light source, whereby the amount of light transmitted through said electrochromic element comprising a portion of said light incident on said photovoltaic cell is variable.

10. The device as claimed in claim 9 wherein said photovoltaic cell is movably mounted with respect to said side of said electrochromic element opposite said light source.

11. The device as claimed in claim 9, wherein said electrochromic element has an overcurrent value at which rapid change in transmissivity occurs, said movable photovoltaic cell providing said electrical current at said overcurrent value in response to an adjustment in said location of said photovoltaic cell.

12. A method for controlling the transmissivity of an electrochromic element in response to a change in intensity of a light beam comprising:

passing at least a part of the light beam through the electrochromic element to form a modulated light beam, said modulated light beam changing in intensity in response to a change in transmissivity of the electrochromic element;

producing an electrical current from said modulated light beam using a photovoltaic cell and applying said electrical current to said electrochromic element using said photovoltaic cell, said electrical current changing in magnitude in response to a change in intensity of said modulated light beam;

whereby the transmissivity of the electrochromic element changes in response to said change in magnitude of said electrical current.

13. A method as claimed in claim 12, wherein said electrochromic element has an overcurrent value at which rapid change in transmissivity occurs; said photovoltaic cell providing said overcurrent value during a change in transmissivity.

14. A method as claimed in claim 12, further comprising the step of adjusting a level of steady-state transmissivity of the electrochromic element for a given modulated light beam intensity by adjusting a variable resistance in parallel with the electrochromic element.

15. A method as claimed in claim 12, further comprising the step of collecting at least a part of the light beam with a lens and directing said part of the light beam toward said electrochromic element.

16. A device for modulating the transmission of light, comprising:

an electrochromic element for varying transmission of light, said element having a first lead and a second lead;

at least one photovoltaic cell for providing electrical current in response to incident light from said light source, said at least one photovoltaic cell having a first lead connected to said first lead of said electrochromic element, and a second lead connected to said second lead of said electrochromic element; and a shunt resistor connected to said first and second leads of said electrochromic element whereby a portion of said current from said photovoltaic cell flows through said shunt resistor without flowing through said electrochromic element.

17. The device as claimed in claim 16, wherein the resistance of said shunt resistor is variable.

18. The device as claimed in claim 17, wherein the resistance of said shunt resistor may be varied using remote control.

19. A device as claimed in claim 16, wherein said shunt resistor comprises a network of fixed resistances interconnected by relays; whereby a resistance of said shunt resistor may be selected by selectively opening and closing said relays.

20. A device as claimed in claim 19, wherein said relays are magnetically controlled.

21. The device as claimed in claim 16, wherein said shunt resistor is a zener diode.

22. The device as claimed in claim 16, further comprising an adjustable shade for varying the light incident on the photovoltaic cell.

23. A device for modulating the transmission of light, comprising:

an electrochromic element for varying transmission of light, said element having first and second leads;

at least one photovoltaic cell for providing electrical current in response to incident light, said at least one photovoltaic cell having first and second leads, said first lead of said at least one photovoltaic cell connected to said first lead of said electrochromic element;

a first switch for selectively connecting said second lead of said electrochromic element with one of said second lead of said photovoltaic cell and said first lead of said electrochromic element.

24. A device as claimed in claim 23, further comprising a shunt resistor connected in parallel between said first and second leads of said electrochromic element.

25. The device as claimed in claim 23, further comprising a resistor having first and second leads, the first lead of said resistor connected to one of said leads of said electrochromic element, a second switch having first and second leads, the first lead of said second switch connected to the second lead of said resistor, and the second lead of said second switch connected to the other of said leads of said electrochromic element, wherein said second switch selectively completes a circuit through said resistor between said leads of said electrochromic element.

26. A device as claimed in claim 23, wherein said first switch is furthermore for selectively disconnecting said second lead of said electrochromic element, thereby placing said lead in an open circuit.

27. A device for modulating the transmission of light, comprising:

an insulated glass unit having a sealed interior;

at least one photovoltaic cell mounted in said interior of said insulated glass unit for providing electrical current in response to incident light;

a modulating circuit in said interior of said insulated glass unit connected to said at least one photovoltaic cell for modulating an output of said photovoltaic cell;

an electrochromic element mounted in said interior of said insulated glass unit and connected to said modulating circuit, for varying the transmission of light through said insulated glass unit in response to an output from said modulating circuit; and a remote control system for remotely varying the output of said modulating circuit, said remote control system comprising a user input unit outside said insulated glass unit and electrically unconnected to said modulating circuit, for user control of said electrochromic element.

28. The device as claimed in claim 27, further comprising a resistance connected in parallel to said electrochromic element, wherein said remote control system remotely varies said parallel resistance.

29. The device as claimed in claim 27, further comprising a resistor connected in series with said electrochromic element, wherein said remote control system varies said series resistance.

30. The device as claimed in claim 27, wherein said remote control system comprises a remotely controlled switch for switching a parallel connection across said electrochromic element from open circuit to intermediate resistance to short circuit.

31. The device as claimed in claim 27, wherein said remote control system varies a current output of said cell.

32. The device as claimed in claim 27, wherein said remote control system comprises a hand-held remote control unit and a sensing circuit mounted to a substrate for sensing signals from said remote control unit.

33. The device as claimed in claim 27, wherein said remote control system comprises at least one magnetically actuated relay in said interior of said insulated glass unit, and at least one magnet outside said insulated glass unit for actuating said relay.

34. The device as claimed in claim 33, wherein said magnet is an electromagnet controllable by said user input unit.

35. The device as claimed in claim 33, wherein said user input unit is a permanent magnet movably mounted outside said insulated glass unit for actuating said at least one relay.

* * * * *

UNITED STATES PATENT AND TRADEMARK OFFICE
CERTIFICATE OF CORRECTION

PATENT NO. : 6,055,089
DATED : April 25, 2000
INVENTOR(S) : Schulz et al.

It is certified that error appears in the above-identified patent and that said Letters Patent is hereby corrected as shown below:

On the title page,

Column 1, after the title, insert --This invention was made with government support under the Advanced Technology Program (Public Law 100-418, 15 U.S.C. 278n, as amended by Public Law 102-245), awarded by the National Institute of Standards and Technology.--

Signed and Sealed this

Tenth Day of April, 2001

Attest:

NICHOLAS P. GODICI

Attesting Officer     Acting Director of the United States Patent and Trademark Office